(No Model.)
G. F. & D. SIMONDS, & A. A. MARSHALL.
Circular Saw.
No. 237,617. Patented Feb. 8, 1881.
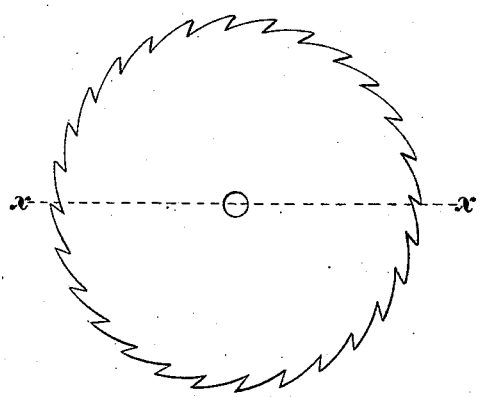
Fig.1.
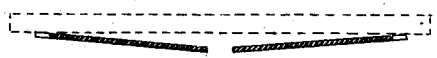   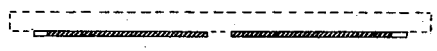
Fig.2.   Fig.3.
   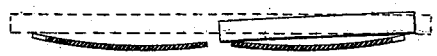
Fig.4.   Fig.5.
Fig.6.
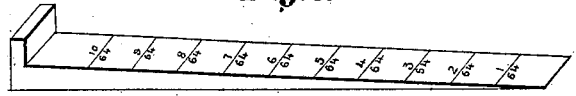
Fig.7.
Witnesses:
H. G. Olmsted
W. P. Preble Jr
Inventors:
George F. Simonds
Daniel Simonds
and Alfred A. Marshall
by W. W. Swan
Their attys.

UNITED STATES PATENT OFFICE.

GEORGE F. SIMONDS, DANIEL SIMONDS, AND ALFRED A. MARSHALL, OF FITCHBURG, MASSACHUSETTS.

CIRCULAR SAW.

SPECIFICATION forming part of Letters Patent No. 237,617, dated February 8, 1881.

Application filed December 9, 1880. (No model.)

*To all whom it may concern:*

Be it known that we, GEORGE F. SIMONDS, DANIEL SIMONDS, and ALFRED A. MARSHALL, all of Fitchburg, in the State of Massachusetts, have invented a new and useful Improvement in Circular Saws, of which the following is a specification.

In Letters Patent No. 207,450, dated August 27, 1878, we have described and claimed a circular saw made firm with reference to its radii, but loose with reference to its diameter. In the specification of that patent it is set forth that it has been found necessary to give to circular saws, when finished, certain delicate and important conditions, having reference, it is supposed, to the tension or strain of different parts upon each other, in order to enable them to perform their work well. These conditions, it is stated, are secured by the manner in which the saw is hammered, and the manner of testing a saw by the application of a straight-edge to ascertain whether it conforms with required conditions is fully and clearly described. In our said patent it is stated, further, that when a circular saw prepared for use is held up vertically with its circumference resting on a table its surface, if the saw is of uniform thickness, should present substantially a plane, but that when a saw is laid down horizontally, or nearly so, and supported at opposite points of the circumference, it will spring or sag so as to distort its surface. This distortion, it is stated, can be detected and observed by laying a straight-edge across the surface of the saw. If a line of light appears between the surface of the saw and the straight-edge, the saw is said to be "loose." If no such line of light appears, the saw is said to be "firm." These conditions "firm" and "loose" are comprehended in the general term "adjustment." A saw is adjusted so as to be firm or loose, as the case may be, at a certain place.

In the drawings hereto annexed and forming a part of this specification, Figure 1 represents a finished saw. Fig. 2 represents a section of a saw with a straight-edge applied from side to side on line $x\,x$ of Fig. 1, and having an adjustment which conforms with the conditions of the saw patented to us in our said Patent No. 207,450—that is, the saw, as stated above, is firm with reference to its radii and loose with reference to its diameter. Fig. 3 represents a straight-edge applied to a section of a saw on line $x\,x$ when the saw has a firm adjustment throughout. Fig. 4 represents a section of the saw on line $x\,x$, with a straight-edge applied from the eye to the circumference, and indicates that the saw is loose in a zone between the eye and the circumference, or, in other words, loose with reference to its radii. Fig. 5 represents a section of the saw on line $x\,x$, with a long straight-edge applied from side to side, and also with a short straight-edge applied from the eye to the circumference, whereby it appears that the saw is loose with reference to its radii, and also has its eye dropped below the plane of its circumference. Fig. 6 represents a section of a saw on line $x\,x$, having straight-edges applied to the diameter and radius to indicate our improved adjustment. Fig. 7 represents the graduated wedge for determining the looseness of the saw.

In Figs. 2 to 6, inclusive, the sectional lines represent the sections of saws of different adjustments, the breaks in the lines being the eyes. The dotted lines represent a long straight-edge applied to the diameter of the saw, and the fine lines represent a short straight-edge applied to the radius.

It will be seen that our new saw of Fig. 6 differs from our old saw of Fig. 2 in being loose with reference to its radii. It differs from the saw of Fig. 3 both in being loose with reference to its radii and in being loose with reference to its diameter. It differs from the saw of Fig. 4 in being loose with reference to its diameter, resembling the saw of Fig. 4, however, in being loose with reference to its radii; and, finally, though our improved saw resembles the saw of Fig. 5 in being loose with reference to both diameter and radii, it differs from the saw of Fig. 5 in being more loose at the eye than at any other part.

To enable the public to readily recognize our improved saw, we have adopted a simple graduated wedge, Fig. 7, which can be introduced between the long straight-edge and the saw, and which will at once determine whether or not the saw is made according to our system. This rule or graduated wedge is not a part of this application, but will be made the subject of a new patent.

We claim—

The improved circular saw herein described, loose with reference to its diameter, and also loose with reference to its radii, but with reference to its diameter more loose at the eye than at any other part.

GEORGE F. SIMONDS.
DANIEL SIMONDS.
ALFRED A. MARSHALL.

Witnesses:
JOHN SIMONDS,
GEO. E. FASON,
HARRIS C. HORTWELL.